(12) United States Patent
Cullum

(10) Patent No.: US 8,257,014 B2
(45) Date of Patent: Sep. 4, 2012

(54) AUTO HOOK-UP DEVICE FOR DISABLED VEHICLES

(75) Inventor: John M. Cullum, Chattanooga, TN (US)

(73) Assignee: Miller Industries Towing Equipment Inc, Ooltewah, TN (US)

( * ) Notice: Subject to any disclaimer, the term of this patent is extended or adjusted under 35 U.S.C. 154(b) by 162 days.

(21) Appl. No.: 12/393,917

(22) Filed: Feb. 26, 2009

(65) Prior Publication Data

US 2010/0232925 A1    Sep. 16, 2010

(51) Int. Cl.
  *B60P 3/12*    (2006.01)
(52) U.S. Cl. .......................... 414/814; 414/563; 280/500
(58) Field of Classification Search .......... 280/500–502, 280/292; 414/563, 814
  See application file for complete search history.

(56) References Cited

U.S. PATENT DOCUMENTS

| | | | | |
|---|---|---|---|---|
| 2,478,736 A * | 8/1949 | Balzen | .......................... | 280/477 |
| 3,046,037 A * | 7/1962 | Cain | .............................. | 280/477 |
| 3,860,267 A * | 1/1975 | Lyons | ......................... | 280/479.3 |
| 3,912,302 A * | 10/1975 | Patterson | .................... | 280/477 |
| 4,131,295 A * | 12/1978 | Highberger | .................. | 280/475 |
| 4,603,878 A * | 8/1986 | Smith, Jr. | .................... | 280/479.2 |
| 4,811,965 A * | 3/1989 | Eubanks | ..................... | 280/455.1 |
| 4,844,497 A * | 7/1989 | Allen | ............................ | 280/477 |
| 4,869,521 A * | 9/1989 | Johnson | ..................... | 280/491.1 |
| 4,962,599 A * | 10/1990 | Harris | ............................. | 37/266 |
| 5,489,112 A * | 2/1996 | Warrington et al. | .......... | 280/495 |
| 7,222,873 B2 * | 5/2007 | Rodgers | ....................... | 280/495 |
| 2004/0251660 A1 * | 12/2004 | Roe et al. | ...................... | 280/515 |
| 2008/0116661 A1 * | 5/2008 | Baltrusaitis et al. | .......... | 280/493 |

OTHER PUBLICATIONS

Mine Resistant Ambush Protected (MRAP) Armored Vehicles; http://www.defense-update.com/products/m/mrap/htm Retrieved: Jan. 7, 2009.

* cited by examiner

*Primary Examiner* — Saul Rodriguez
*Assistant Examiner* — Jonathan Snelting
(74) *Attorney, Agent, or Firm* — Michael P. Mazza, LLC

(57) ABSTRACT

An auto-latch mechanism enabling a towing vehicle to hook-up and tow-away a disabled vehicle without the need for either operator of the vehicles to exit their interior. In a preferred embodiment, the auto-latch mechanism includes opposing guide plates and a plunger pin with a distal portion movable to a location between the plates. When a connecting portion of the disabled vehicle is positioned between the opposing plates, the plunger pin may be engaged to the connecting portion, to thereby accomplish hook-up of the disabled vehicle to the towing vehicle. A method for using the auto-latch mechanism is also disclosed and claimed.

7 Claims, 4 Drawing Sheets

AUTO HOOK-UP DEVICE FOR DISABLED VEHICLES

BACKGROUND OF THE INVENTION

The present invention generally relates to the automatic latching of a disabled vehicle to a towing vehicle in the field, without the need for the operator of either vehicle to exit from his/her vehicle.

The invention has special advantage with vehicles in which it is desirable to stay within the vehicle during hook-up and connection of the disabled vehicle. For example, the present invention provides particular advantages when used to recover military vehicles such as armored Hummers known as mine-resistant, ambush-protected (MRPA) armored vehicles, which have been used to advantage by military personnel in combat zones. When disabled, such vehicles are currently manually rigged, such as by chains connected to an eye-hook located on the front of the disabled vehicle, enabling pick-up by the cross-bar of the towing vehicle. This manual rigging is fraught with peril for the operator, who is located outside the armored vehicle and is vulnerable to sniper fire or other attack.

The present invention solves this problem by providing apparatus attachable to the armored vehicle and enabling its automatic latching to the towing vehicle, such that the operators of both vehicles may remain within the armored vehicle during hook-up and tow-away.

The problem of providing an auto-latching device is exacerbated by the fact that different manufacturers equip their armored vehicles with different latching mechanisms, such as different-sized and shaped eye-hooks. Accordingly, it would be advantageous to provide an auto-latch mechanism, including one that is capable of connection to connection mechanism located on the disabled vehicle and having different sizes and shapes.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Auto-latch mechanism" means a mechanism that may be used to connect a towing vehicle with a connector (e.g., an eye-hook such as an apertured chassis lug attached to a bumper) located on a disabled vehicle, enabling a tow-away, without the need for the operator of either vehicle to exit his/her vehicle.

"Tow-away" means that the towing vehicle has been connected to the disabled vehicle, and refers to the act of the disabled vehicle towing away the disabled vehicle to an alternate location.

SUMMARY OF THE INVENTION

The objects mentioned above, as well as other objects, are solved by the present invention, which overcomes disadvantages of prior latching devices, while providing new advantages not previously obtainable with such devices.

In one preferred embodiment of the present invention, an auto-latching device is attachable in the field to the disabled vehicle and may include a pair of forks or plates carried by a crossbar on the towing vehicle; the plates may straddle each side of a connection point protruding from the bumper of the disabled vehicle (e.g., a lug or eye-hook). A movable plunger pin may be permitted to connect the connection point to the plates, to align the crossbar with the plates and the connection point.

More specifically, in one preferred embodiment, an auto-latch mechanism is provided enabling a towing vehicle to hook-up and tow-away a disabled vehicle. In this embodiment, the auto-latch mechanism may include opposing plates supported by a portion of the disabled vehicle, such as by its rearwardly-extending crossbar. The auto-latch mechanism also preferably includes a plunger pin with a distal end movable to a location between the plates, to connect the towing device to the disabled vehicle. When a connecting portion of the disabled vehicle (e.g., an apertured lug or I-pin attached to a bumper) is positioned between the opposing plates, the plunger pin may be engaged to the connecting portion, to thereby accomplish hook-up of the disabled vehicle to the towing vehicle without the need for the operator of either the towing vehicle or the disabled vehicle to leave the safety of the interior of the vehicles. A support located between the plates, such as a curved plate, may be used to bear the weight of the connection portion and, thus, the disabled vehicle weight.

In alternative embodiments, movement of the plunger pin may be controlled by a spring, or by air or hydraulic cylinders. A distal portion of the plunger pin may terminate in a tapered portion.

A method for using an auto-latch mechanism to enable a towing vehicle to hook-up and tow-away a disabled vehicle also forms part of the invention. With this method, an auto-latch mechanism may be provided having opposing guide plates and a plunger pin whose distal end is movable into a location between the opposing guide plates. Next, the auto-latch mechanism may be mounted to the towing vehicle, such as by mounting it to a rearwardly-extending crossbar on the towing vehicle. Now the auto-latch mechanism may be positioned, by moving the towing vehicle and/or its crossbar, adjacent a connecting portion (e.g., a chassis lug attached to the bumper) on the disabled vehicle, so that the connecting portion is located between the opposing guide plates. The crossbar may be moved upwardly so that the plunger pin is permitted to engage a portion of the connecting portion (e.g., a distal portion of a spring-loaded or air pressurized plunger pin may be permitted to enter through an aperture on the lug), thereby securing hook-up of the disabled vehicle to the towing vehicle without the need for the operator of either the towing vehicle or the disabled vehicle to leave the safety of the interior of the vehicles. A support plate may be located between the guide plates to bear the weight of the connection portion.

In a preferred embodiment, the auto-latch mechanism may include a pair of mirror-image latches secured to opposing ends of the crossbar. As one example, the latches may be secured to slidable shoes mounted on opposing ends of the crossbar.

Other embodiments in keeping with the principles of the invention will be apparent to those of ordinary skill in the art, particularly after review of the following detailed description of the preferred embodiments and accompanying drawings.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

Figure 1:
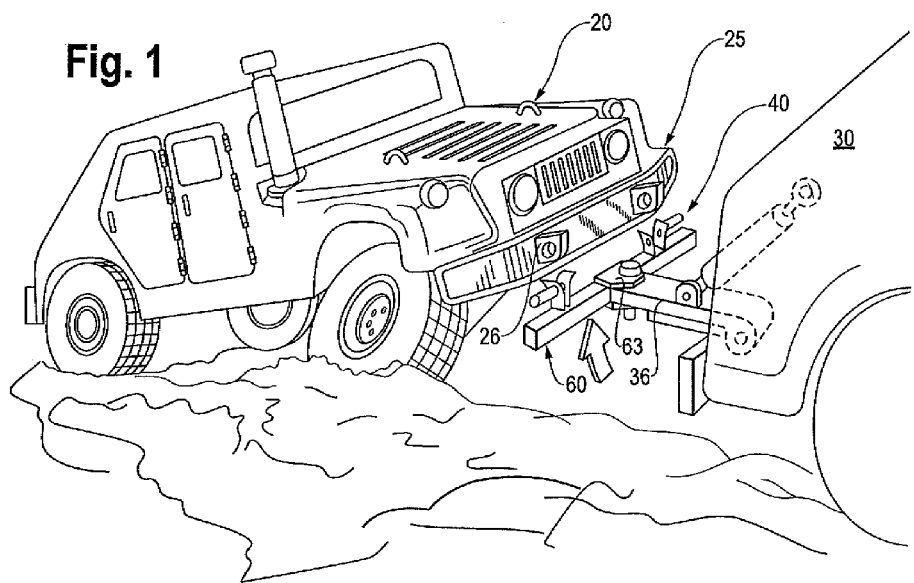
FIG. 1 is a perspective view showing a disabled vehicle whose front end is in the act of being coupled to a one preferred embodiment of an auto hook-up device of the present invention rear-mounted to a towing vehicle.

The components in the drawings are not necessarily to scale, emphasis instead being placed upon clearly illustrating the principles of the present invention.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Referring to FIGS. 1-7, a preferred embodiment of the present invention, a spring-loaded, self-engaging latch, is shown, generally identified with reference numeral 40, mounted on crossbar 60 of towing vehicle 30. Referring to FIG. 1, latch 40 is designed to couple to a connecting portion on disabled vehicle 20, such as apertured lugs 26 protruding from bumper 25 of the disabled vehicle, as explained in more detail below.

Figure 2:
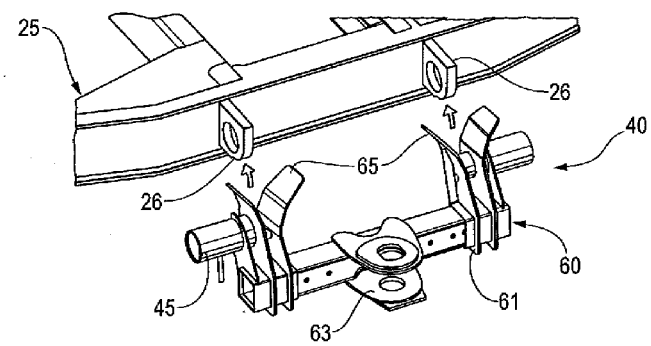
FIG. 2 is a partial, enlarged perspective view of the front bumper of the disable vehicle and the auto hook-up device shown in FIG. 1.
Figure 3:
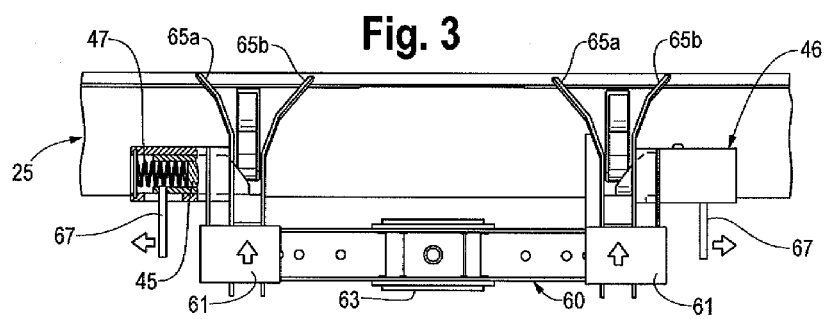
FIG. 3 is a front view of FIG. 2.

In the preferred embodiments shown in FIGS. 1-9, and referring for example to FIGS. 2 and 3, right- and left-side self-engaging latches 40 may be mounted to slidable shoes 61 on opposed ends of crossbar 60. (Alternatively, only one, centered latch may be used, although this may not be preferred for stability reasons.) Opposing, tapering-away guide forks or guide plates 65a, 65b on latch 40 may be mounted directly to and be part of the weldment of shoes 61, and each plate 65/shoe 61 weldment may be slid over the opposing ends of crossbar 60, for example, and secured using a locking pin (not shown).

Figure 6:
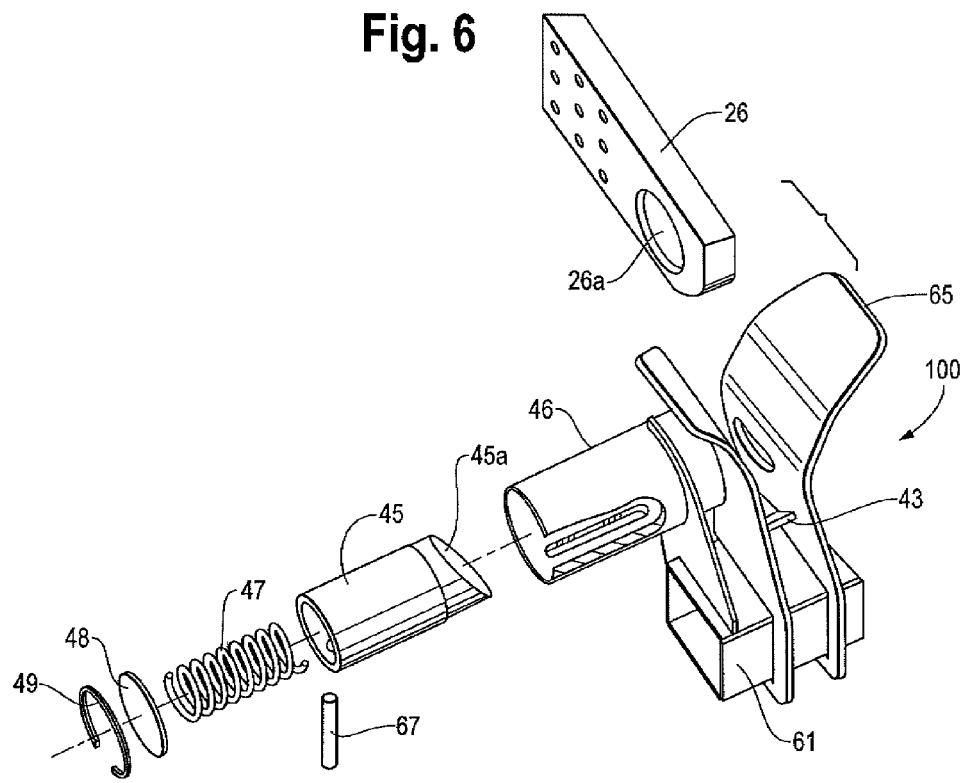
FIGS. 6 and 7 are enlarged, left/front and right/front parts perspective views of the portion of the device shown in FIG. 5.
Figure 7:
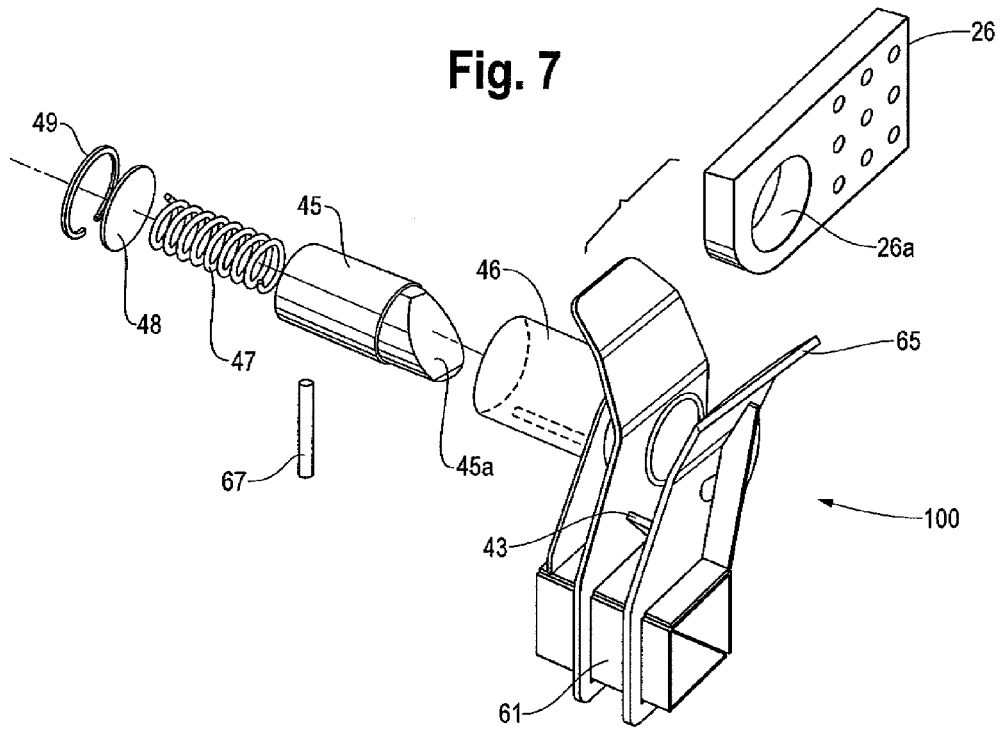

Referring now to FIGS. 6 and 7, latch 40 may also include a housing 46 enclosing spring-loaded plunger 45 having tapering end 45a, and spring 47 fitting within plunger 45, and retained within plunger 45 by cap 48 and a locking ring 49. (Right-hand and left-hand assemblies mirror each other.)

Figure 4:
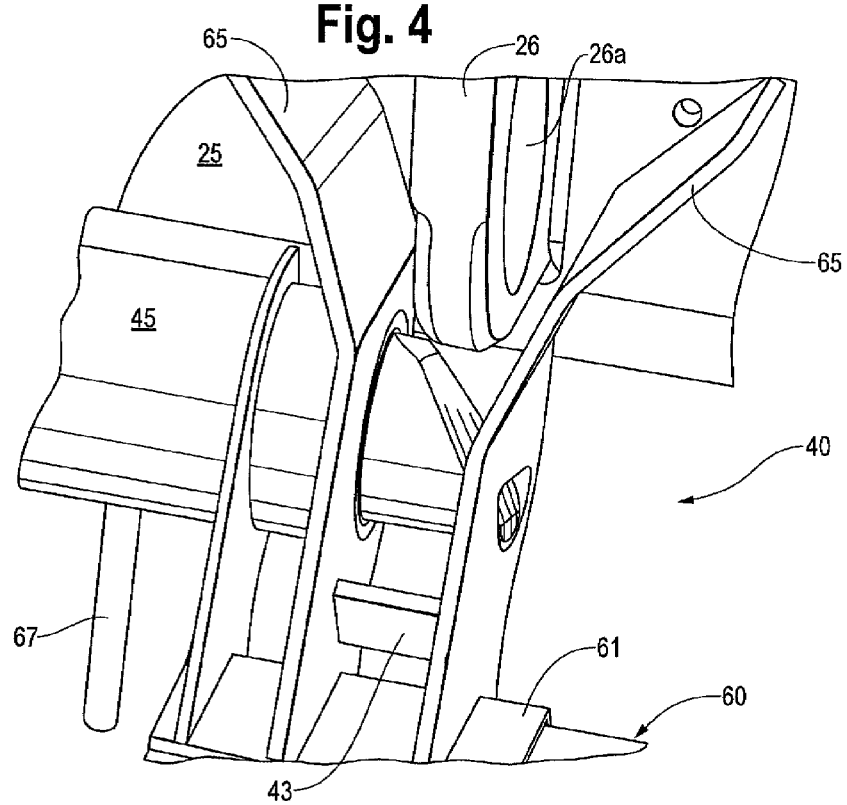
FIG. 4 is an enlarged, perspective view of a right side of the device shown in FIGS. 2 and 3.
Figure 5:
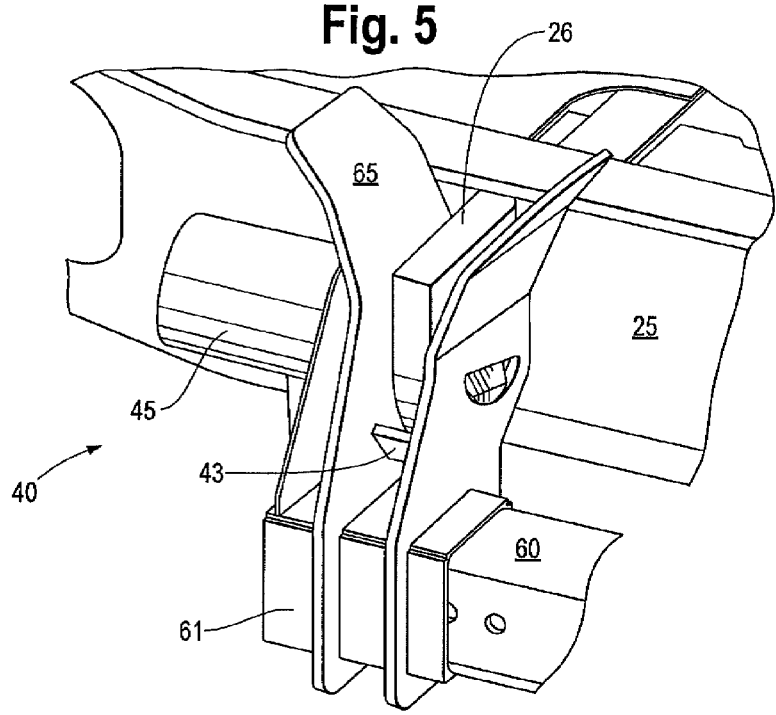
FIG. 5 is an enlarged, perspective view of the left side of the device shown in FIGS. 2 and 3.

Referring to FIGS. 4 and 5, curved plate 43 is located between guide plates 65 and below the distal end of plunger pin 45. Curved plate 43 is positioned at a height such that when apertured lug 26 rests its weight on curved plate 43 as explained below, the tapered end 45a of plunger pin 45 will be at the appropriate level to pass through aperture 26a of lug 26.

The operation of auto latch 40 will now be described. Should vehicle 20 become disabled, tow bar 36 of towing vehicle 30 (which may be connected to crossbar 60 using central guide plate 63) may be positioned adjacent bumper 25 and latches 40 on disabled vehicle 20. By raising the tow bar, opposing guide plates 65 may guide lugs 26 into position between the plates 65, so that plunger 45 is permitted to contact a lower portion of the lugs 26 on bumper 25. (Alternatively, latches 40 could be coupled to lugs or other connective devices on the rear bumper of the disabled vehicle.) As lug 26 presses down on plunger tapered end 45a, a portion of the plunger will retract back into housing 46, permitting tapered end 45a to engage aperture 26a of chassis lug 26, as shown in FIGS. 4-5. Given the position of curved plates 43, it can be seen that the weight of lugs 26 (and thus the weight of the suspended disabled vehicle) may be borne by curved plates 43, rather than by plunger pins 45. Lug contact with curved plate 43 also assists in lining up latch 40 so that plunger pin 45 is permitted to pass through lug aperture 26a. Locking pin 67 may now be used to secure lug 26 to engaged plunger 45. Thus, in the preferred embodiment, latch 40 works as a slam-type lock, similar to a door lock, to auto-connect latch 40 of disabled vehicle 22 with chassis lugs 26 of towing vehicle 30.

Figure 8:
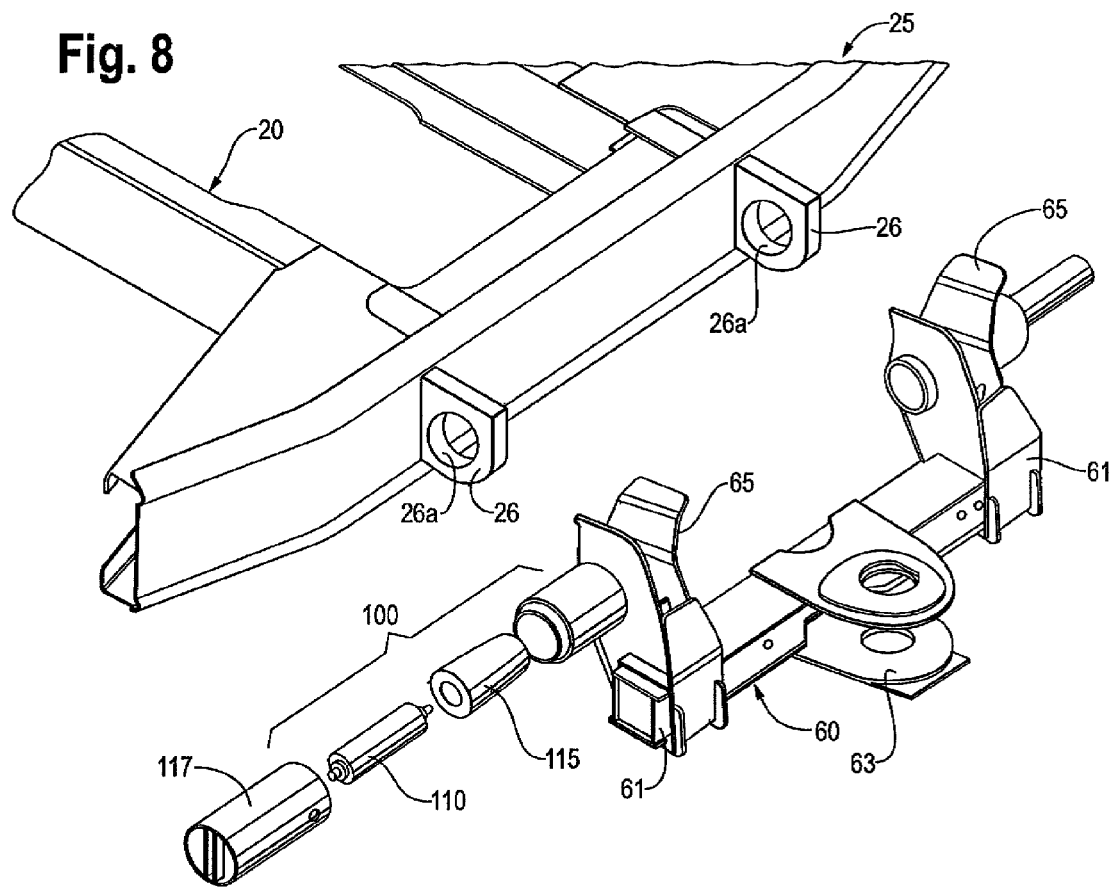
FIG. 8 is an enlarged, top and left, partial-parts perspective view of an alternative embodiment of the auto latch device of the present invention.
Figure 9:
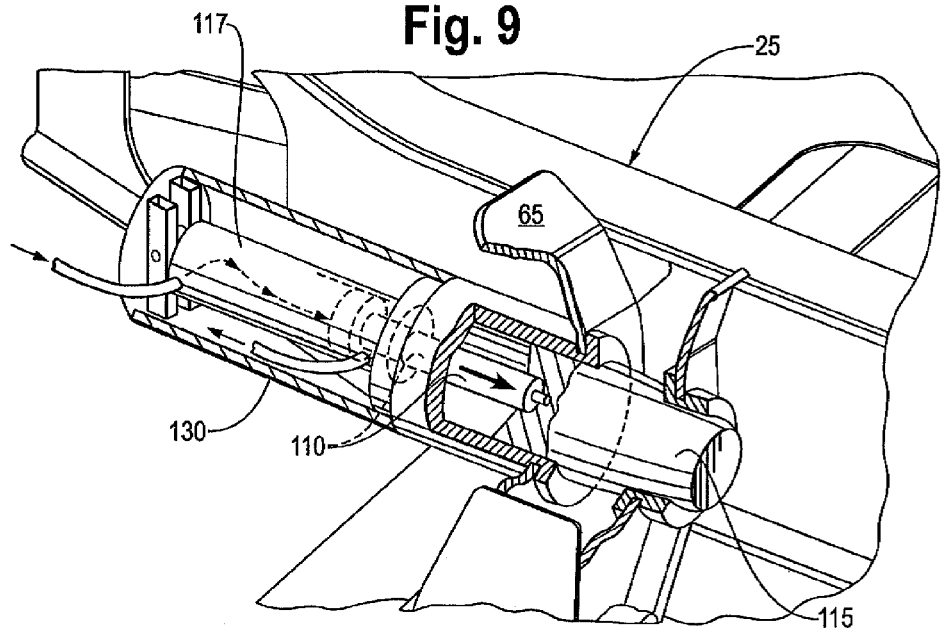
FIG. 9 is an enlarged, partially cut-away and partially sectioned view of the left-side device shown in FIG. 8.

Referring now to FIGS. 8-9, an alternative auto-latch mechanism 100 is shown. In this alternative embodiment, auto-latch mechanism 100 may be positioned similar to the manner as shown with latch 40 in FIGS. 1-7. Auto-latch mechanism 100 may include an air cylinder 110 enclosed by a sleeve or housing 117, which may in turn be enclosed by a protective casing 130. The rear end of air cylinder 110 may be attached to the inside rear end of sleeve 117. Casing 130 and/or sleeve 117 serves to protect the air cylinder, such as from unfriendly fire. Air cylinder 110 may be employed to drive movement of plunger pin 115 into lugs 26 as described above. In the preferred embodiment, the air cylinder may be attached directly to the plunger, and the air cylinder is preferably double-acting. Alternatively, rather than using an air cylinder, a hydraulic oil-operated cylinder may be employed. Curved plate 43 may be used but to facilitate positioning of the plunger pin relative to the lug aperture 26a; however, plate 43 is not strictly necessary for the working of the air cylinder due to the different shape of the distal end of plunger pin 115.

To summarize, with either embodiment disclosed above, auto-latch mechanism 40/100 may be attached to the crossbar of the tow truck and may be slid, side-to-side, and up-and-down, to align the assemblies with the lugs 22 of the bumper of the disabled vehicle, to accomplish hook-up and tow away, without the need for the operators of either the towing or disabled vehicles to leave the safety of their vehicles.

The above description is not intended to limit the meaning of the words used in the following claims that define the invention. For example, while preferred embodiments have been described above, persons of ordinary skill in the art will understand that a variety of other designs still falling within the scope of the following claims may be envisioned and used. It is contemplated that future modifications in structure, function or result will exist that are not substantial changes and that all such insubstantial changes in what is claimed are intended to be covered by the claims.

I claim:

1. A method for using an auto-latch mechanism mounted on a crossbar of a towing vehicle to enable the towing vehicle to hook-up and tow-away a disabled vehicle, wherein the disabled vehicle has a connecting portion for engagement with the auto-latch mechanism, comprising the steps of:

providing the auto-latch mechanism with opposing guide plates mounted on the crossbar and a plunger pin having a distal end movable into a location between the opposing guide plates;

raising the crossbar to locate the connecting portion of the disabled vehicle between the opposing guide plates, to cause the connecting portion of the disabled vehicle to exert downward pressure on the distal end of the plunger pin, and to force the plunger pin to retract away from the location between the opposing guide plates to allow further downward entry of the connecting portion between the guide plates; and extending the plunger pin toward the location between the opposing guide plates so that the plunger pin engages the connecting portion and each of the opposing guide plates, thereby securing hook-up of the disabled vehicle to the towing vehicle without the need for the operator of either the towing vehicle or the disabled vehicle to leave the safety of an interior of the vehicles.

2. The method of claim 1, wherein the auto-latch mechanism comprises a mirror-image pair of the opposing guide plates and the plunger pin, each of the mirror-image pairs being mounted to an opposing end of a the crossbar of the towing vehicle.

3. The method of claim 1, wherein the connecting portion comprises an apertured chassis lug attached to a bumper of the disabled vehicle.

4. The method of claim 1, further comprising a support plate located between the opposing guide plates, wherein following the step of the a distal end of the plunger pin initially engaging the connecting portion, the connecting portion is permitted to rest its weight on the support plate, and wherein the support plate also facilitates location of the connecting portion so that the plunger pin engages the connecting portion and each of the opposing guide plates.

5. The method of claim 2, wherein the connecting portion comprises a pair of apertured chassis lugs each attached to a portion of a bumper of the disabled vehicle, wherein each chassis lug may be engaged, using a corresponding plunger pin, to the location between each of a corresponding pair of the opposing guide plates.

6. The method of claim 4, wherein the support plate is curved.

7. The method of claim 1, further comprising a locking mechanism for locking the plunger pin in securely engaging position with the connecting portion to the opposing guide plates.

* * * * *